(12) United States Patent
Ashibe et al.

(10) Patent No.: US 7,094,973 B2
(45) Date of Patent: Aug. 22, 2006

(54) SUPERCONDUCTING CABLE JOINT STRUCTURE

(75) Inventors: Yuuichi Ashibe, Osaka (JP); Yoshihisa Takahashi, Tokyo (JP); Shoichi Honjo, Tokyo (JP); Keisuke Etoh, Tokyo (JP)

(73) Assignees: Sumitomo Electric Industries, Ltd., Osaka (JP); The Tokyo Electric Power Company, Incorporated, Tokyo (JP)

( * ) Notice: Subject to any disclaimer, the term of this patent is extended or adjusted under 35 U.S.C. 154(b) by 7 days.

(21) Appl. No.: 10/840,336

(22) Filed: May 7, 2004

(65) Prior Publication Data

US 2004/0256126 A1 Dec. 23, 2004

(30) Foreign Application Priority Data

Jun. 19, 2003 (JP) ............................. 2003-174396

(51) Int. Cl.
H01B 12/00 (2006.01)
(52) U.S. Cl. .................. 174/125.1; 174/15.4; 505/230; 29/599
(58) Field of Classification Search ............. 174/125.1, 174/15.4, 15.5; 29/599; 505/230, 885, 925, 505/926, 220, 236, 706
See application file for complete search history.

(56) References Cited

U.S. PATENT DOCUMENTS

| | | | |
|---|---|---|---|
| 3,801,723 A * | 4/1974 | Kubo et al. ................. | 174/15.3 |
| 3,959,576 A * | 5/1976 | Penczynski et al. ........ | 174/15.3 |
| 4,794,688 A | 1/1989 | Wada et al. | |
| 6,049,036 A * | 4/2000 | Metra ......................... | 174/15.5 |
| 6,255,595 B1 * | 7/2001 | Metra et al. ............. | 174/125.1 |
| 6,262,375 B1 * | 7/2001 | Engelhardt et al. ...... | 174/125.1 |
| 6,743,984 B1 * | 6/2004 | Nassi et al. .............. | 174/125.1 |

FOREIGN PATENT DOCUMENTS

| | | |
|---|---|---|
| GB | 2 331 868 A | 6/1999 |
| GB | 2 350 495 A | 11/2000 |
| JP | 63-254683 | 10/1988 |
| JP | 7-312237 | 11/1995 |
| JP | 07-335358 | 12/1995 |
| JP | 11-121059 | 4/1999 |
| JP | 2002-140943 | 5/2002 |
| JP | 2002-140944 A | 5/2002 |
| WO | WO 80/02084 | 10/1980 |

* cited by examiner

Primary Examiner—Ishwar (I. B.) Patel
(74) Attorney, Agent, or Firm—Foley & Lardner LLP

(57) ABSTRACT

A superconducting cable joint structure is a structure used to joint together superconducting cables used at cryogenic temperature or to joint together a terminal of the superconducting cable and a normal conducting cable, and it includes a joint insulation layer arranged radially outer than a portion connecting the superconducting cables' respective conductors together or the superconducting cable's conductor and the normal conducting cable's conductor together, and at least one coolant path provided at the joint insulation layer to cool the portion connecting the conductors together. The cable cores can have their connection prevented from generating heat to have an increased temperature.

21 Claims, 7 Drawing Sheets

SUPERCONDUCTING CABLE JOINT STRUCTURE

BACKGROUND OF THE INVENTION

1. Field of the Invention

The present invention relates generally to superconducting cable joint structures and more specifically to effectively preventing a conductor connection from overheating in jointing and thus connecting an end of a core of a superconducting cable to a counterpart conductor.

2. Description of the Background Art

Currently, cities and the like have a tendency to consume increasing amounts of power, and accordingly require larger underground power transmission capacities. Accordingly, a superconducting cable allowing as large a current density as approximately 100 times that of a conventional cable is being developed. This superconducting cable is, as disclosed for example in Japanese Patent Laying-Open No. 2002-140943, structured such that a plurality of cable cores having a superconductor pass through an external casing's internal space having liquid nitrogen or the like flowing therethrough to serve as a coolant layer.

To lay the aforementioned superconducting cable underground, it is necessary to connect together such superconducting cables of a prescribed length. Currently, however, there has not been a method proposed to suitably joint a superconducting cable currently being studied. Japanese Patent Laying-Open No. 7-335358 discloses jointing and thus connecting together a conventional, non-superconducting power cable and a counterpart power cable. More specifically, as shown in FIG. 11, power cables 1 have their respective ends with their respective, exposed conductors 2 abutting against each other and connected together by a conductor connection sleeve 3 externally fitted thereon and furthermore they are externally, circumferentially surrounded by an oil impregnated paper.

However, if the method of jointing conventional power cables 1 together, as shown in FIG. 11, is employed to joint and thus connect together cores of superconducting cables, respectively, conductor connection sleeve 3, which is a normal conductor, and a superconductor will be connected together. This provides an increased value in resistance at a portion connecting the normal conductor and the superconductor together. As a result, an increased quantity of heat is generated and a coolant surrounding the cable cores may bubble and as a result destroy a coolant impregnated paper, and to maintain the cable's superconducting property a refrigerator having a large capacity is required. Furthermore, the increased resistance at the portion connecting the conductor connection sleeve of the normal conductor and the superconductor together, contributes to a reduced current capacity of the superconducting cable in its entirety.

SUMMARY OF THE INVENTION

The present invention contemplates jointing and thus connecting together cores of superconducting cables, respectively, while preventing a connection from generating heat to increase temperature and also allowing the connection to provide a reduced current resistance and thus generate a reduced quantity of heat.

The present invention in one aspect provides a structure jointing together superconducting cables used at cryogenic temperature, or jointing together a terminal of the superconducting cable and a normal conducting cable, the structure including: a joint insulation layer provided at an external circumference of a conductor connection connecting together conductors of the superconducting cables, respectively, or connecting together the conductor of the superconducting cable and a conductor of the normal conducting cable; and at least a single coolant path provided at the joint insulation layer to cool the conductor connection. Note that in the present invention the normal conducting cable also includes a lead rod, an electric current lead and other similar connection rods and conductor drawing rods and other similar metal rods.

The joint insulation layer is provided with a coolant path receiving and passing a coolant. When the conductor connection generates heat the coolant flowing through the coolant path can remove the heat to prevent the conductor connection from overheating.

Preferably in the present structure the superconducting cable has an external casing and a cable core inserted into an internal space of the external casing. The cable core has a former formed of a long filament, a superconducting layer provided on a radially outer surface of the former, and an insulation layer arranged radially outer than the superconducting layer. The internal space serves as a coolant layer passing a coolant therethrough, the coolant layer directly contacting the joint insulation layer, with coolant path passing the coolant of the coolant layer.

Thus a coolant used to cool a cable core having a superconducting layer serving as the conductor can also be passed into a coolant path of a joint insulation layer.

Preferably in the present structure the joint insulation layer is formed of coolant impregnated papers deposited in layers. The joint insulation layer formed of coolant impregnated layers can also be used to directly cool the conductor connection. This can interact with the effect achieved by the coolant path to cool the conductor connection, achieving a synergistic effect.

Preferably the present structure further includes a conductor connection sleeve arranged at the conductor connection and compression-connected to a radially other surface of the conductors of the superconducting cables arranged to abut against each other or a radially outer surface of the conductor of the superconducting cable and the conductor of the normal conducting cable arranged to abut against each other. Conductors abutting against each other that are connected together by an externally fitted conductor connection sleeve can have their joint maintained mechanically stably.

Preferably in the present structure the coolant path has a radially inner opening along a radially outer surface of the conductor connection sleeve to allow the radially outer surface to directly contact the coolant.

Opposite conductors are connected together by an externally fitted conductor connection sleeve, and the sleeve generates heat. However, a coolant path having a radially inner opening communicating with the sleeve can pass a coolant through the radially inner opening to cool the sleeve's radially outer surface directly and hence more efficiently to effectively prevent the sleeve from overheating.

Preferably in the present structure the coolant path has an inclined path connecting the radially inner opening to a radially outer opening of the coolant path.

If the coolant path forms a right angle relative to the longitudinal direction of the cable and thus provides a significantly angled portion a voltage applied to the conductor may increase an electric field created at a boundary of the insulation layer and the coolant path, and an equipotential surface of the electric field created therearound may not be maintained at the significantly angled portion in parallel, resulting in the electric field exceeding a critical value. The coolant path that is inclined can effectively contribute to an alleviated electric field created at a boundary plane of the insulation layer and the coolant path.

Furthermore, the joint insulation layer may be formed of an insulating resin molding provided with a coolant path. In other words, it is not required to be coolant impregnated papers deposited in layers.

Preferably in the present structure the superconducting cable and the normal conducting cable are connected together via the conductor connection such that the conductor protruding from the normal conducting cable and a conductor of the superconducting cable are connected together via the conductor connection circumferentially provided with the joint insulation layer, and the coolant path is arranged at an interface of an end surface of the joint insulation layer and an outer end surface of the normal conducting cable.

A normal conducting cable's conductor and a superconducting cable are connected together and a portion such that the normal conducting cable and the joint insulation layer have an interface provided with a coolant path. The coolant path can be readily formed. Furthermore when the conductor connection generates heat, the heat can be diffused to the coolant path to prevent the conductor connection from overheating.

Preferably, the normal conducting cable provides a securing portion of insulator formed of epoxy resin presenting high heat resistance, a small percentage of contraction (high dimensional stability) as it cures, and an excellent adhesive property.

Preferably in the present structure the interface is inclined relative to a longitudinal direction of the cable core and provided with the coolant path.

If the coolant path forms a right angle relative to the longitudinal direction of the cable and thus provides a significantly angled portion a voltage applied to the conductor may increase an electric field created at a boundary of the insulation layer and the coolant path, and an equipotential surface of the electric field created therearound may not be maintained at the significantly angled portion in parallel, resulting in the electric field exceeding a critical value. The coolant path that is provided at an inclined plane can effectively contribute to an alleviated electric field at the boundary.

If the coolant path forms a right angle relative to the longitudinal direction of the cable and thus provides a significantly angled portion an equipotential surface of an electric field created therearound by a current flowing through the conductor may not be maintained at the significantly angled portion in parallel, resulting in the electric field exceeding a critical value. The coolant path that is provided at an inclined interface can facilitate in the joint insulation layer an electric field's equipotential to be maintained substantially parallel to prevent electric field from increasing.

The present invention in another aspect provides a superconducting cable joint structure jointing together superconducting cables used at cryogenic temperature, or jointing together a terminal of the superconducting cable and a normal conducting cable. The structure includes: a conductor connection allowing the conductor cables to have their respective conductors abutting against each other and connected together, or allowing the superconducting cable and the normal conducting cable to have their respective conductors abutting against each other and connected together; a conductor connection sleeve compression-connecting a circumference of the conductor connection; a superconducting wire provided on a radially outer surface of the conductor connection sleeve or buried internal to the conductor connection sleeve to alleviate generation of heat; and a joint insulation layer provided at an outer circumference of the conductor connection sleeve or the superconducting wire.

As the superconducting wire connected to the conductor connection sleeve's outer or inner surface is significantly smaller in resistance than the sleeve, a current from a conductor (a superconductor) of a superconducting cable tends to flow through the wire rather than the sleeve. A reduced amount of heat can thus be generated. Furthermore at the conductor connection a current tends to flow through the superconducting wire, rather than the conductor connection sleeve, as the wire is has smaller resistance than the sleeve. The superconducting cable as seen in entirety can be prevented from having reduced current capacity.

The superconducting wire has opposite ends electrically connected to the conductor of each of two the superconducting cables to be connected together, or the conductor of the superconducting cable and the conductor of the normal conducting cable to be connected together.

Thus a superconducting wire small in resistance can directly crosslink connection of conductors of superconducting cables, respectively, to alleviate generation of heat and the conductor connection sleeve can maintain a steady joint.

Suitably the superconducting wire is arranged on the conductor connection sleeve at a radially outer surface longitudinally or spirally wound therearound and soldered thereto.

The present invention in still another aspect provides a superconducting cable joint structure jointing together superconducting cables used at cryogenic temperature, or jointing together a terminal of the superconducting cable and a normal conducting cable. The structure includes: a conductor connection allowing the conductor cables to have their respective conductors abutting against each other, welded and electrically connected together, or allowing the superconducting cable and the normal conducting cable to have their respective conductors abutting against each other, welded and electrically connected together; a superconducting wire arranged on a circumference of the conductor connection longitudinally or wound therearound to alleviate generation of heat; and a joint insulation layer arranged radially outer than the superconducting wire.

As the superconducting wire connected to the conductor connection sleeve's outer or inner surface is significantly smaller in resistance than the sleeve, a current from a superconducting layer of a cable core tends to flow through the wire rather than the sleeve. A reduced amount of heat can thus be generated. Furthermore at the conductor connection a current tends to flow through the superconducting wire, rather than the conductor connection sleeve, as the wire is has smaller resistance than the sleeve. The superconducting cable as seen in entirety can be prevented from having reduced current capacity.

Preferably in the present structure the joint insulation layer has at least one coolant path. This is further preferable as an approach against heat, as such can interact with the effect of alleviating generation of heat, achieving a synergistic effect through the coolant path to diffuse heat.

The superconducting cable and the normal conducting cable have the conductor connection such that the superconducting cable has a conductor protruding therefrom, the superconductor and the conductor of the superconducting cable are connected together via the conductor connection with the joint insulation layer arranged radially outer than the conductor connection, and furthermore, an end surface of the joint insulation layer and an outer end surface of the normal conducting cable are connected together forming an interface and the interface is provided with a coolant path. This is preferable as such allows the coolant path to be readily formed and can also prevent the conductor connection from overheating.

The superconducting cable includes a cable core having a former formed of a long filament, a superconducting layer spirally wound around the former's circumference in multiple layers, and an insulation layer radially outer than the superconducting layer. The cable core has a terminal with the former and the superconducting layer exposed stepwise, and the conductor connection sleeve has a radially inner or outer surface with a superconducting wire buried therein to alleviate generation of heat and connected to the stepwise exposed former and superconducting layer. The superconducting layer stepwise exposed allows the conductor connection sleeve to establish steady electrical connection with each layer's superconducting layer.

The above structure, as specifically configured, has more than one cable core interconnected, each having a shield layer with a superconducting wire arranged radially outer than the insulation layer, and a protection layer formed of an insulator and arranged radially outer than the shield layer, and the superconducting layer of the cable core and the superconducting layer of another cable core or the conductor of the normal conducting cable are connected together via the conductor connection covered with the joint insulation layer.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

The present invention in embodiments will now be described with reference to the drawings.

Figure 1A:
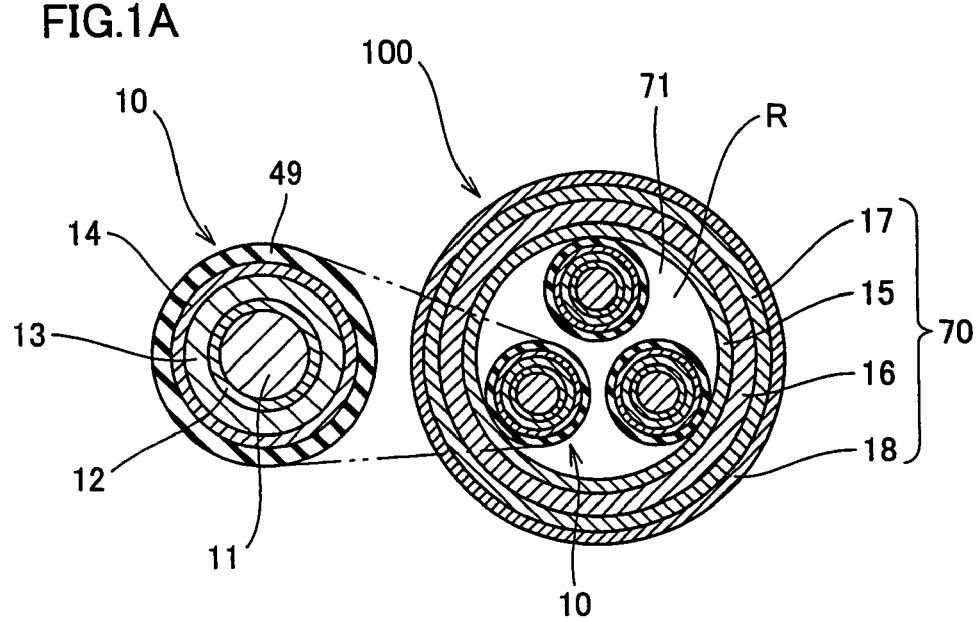
FIG. 1A is a cross section of the present superconducting cable in an embodiment.

With reference to FIG. 1A, the present embodiment provides a superconducting cable 100 including, as seen radially outward, an inner corrugated pipe 15, an insulation layer 16, an outer corrugated pipe 17 and an anti-corrosive layer 18 deposited in layers to form a cylinder to form an external casing 70 serving as an insulation pipe. External casing 70 has an internal space 71 serving as a coolant layer R and also passing three cable cores 10 therethrough. Inner and outer corrugated pipes 15 and 17 are corrugated cylinders formed of stainless steel and anti-corrosive layer 18 is formed for example of polyvinyl chloride (PVC). Coolant layer R uses a coolant of liquid nitrogen, liquid helium or the like.

Figure 1B:
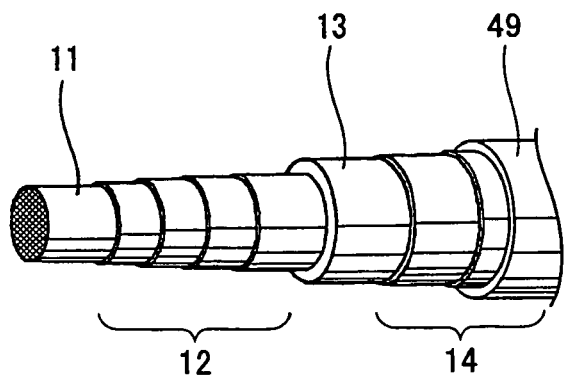
FIG. 1B is a perspective view of a cable core.

Cable core 10, as shown in FIGS. 1A and 1B, includes a former 11 formed of copper wires twisted together and placed at the center of the core, a superconducting layer 12 formed of a superconductor spirally wound around former 11, and an insulation layer 13, a shield layer 14, and a protection layer 49 wound around an outer circumference of superconducting layer 12.

Former 11 is formed of a large number of copper wires having a strand insulated that are twisted together to maintain the cable core 10 mechanical characteristics (rigidity, bending characteristic, and the like) and also reduce a loss of eddy current in the former. Furthermore, as former 11 has an outer circumference with superconducting layer 12 wound therearound and superconducting layer 12 is significantly lower in resistance, a current tends to flow through superconducting layer 12 rather than former 11. It should be noted, however, that if an eddy current flows and a critical current Ic is exceeded, superconducting layer 12 will be increased in resistance and former 11 will also pass a current and function as a bypass for safety. Former 11 may be formed of metal other than copper.

Figure 1C:
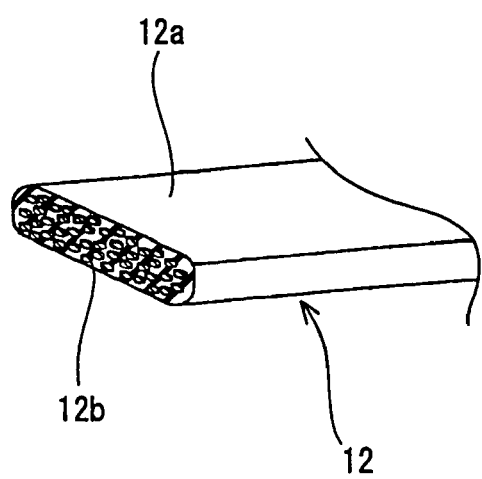
FIG. 1C is a perspective view of a superconductor.

Superconducting layer 12 is, as shown in FIG. 1C, is formed of a wire in the form of a tape formed of bismuth (Bi)-2223, superconducting filaments $12b$ and a silver $12a$ (or a silver alloy) covering the filaments. Superconducting filament $12b$ may be formed of ceramic for example of yttrium oxide, thallium oxide, bismuth oxide.

Insulation layer 13 is formed of a polypropylene laminated paper (PPLP) formed of a polypropylene film at least having one surface with a kraft paper bonded thereon. Insulation layer 13 is impregnated with a coolant and it is in a low temperature insulation system. Alternatively, insulation layer 13 may be a paper formed for example of polyethylene film, polypropylene film and the like combined together.

Shield layer 14 has a configuration similar to that of superconducting layer 12 and passes a current in a direction opposite to superconducting layer 12 to cancel a magnetic field.

Superconducting cable 100 has cable core 10 jointed and connected in a first embodiment, as will be described hereinafter.

FIRST EMBODIMENT

Figure 2A:
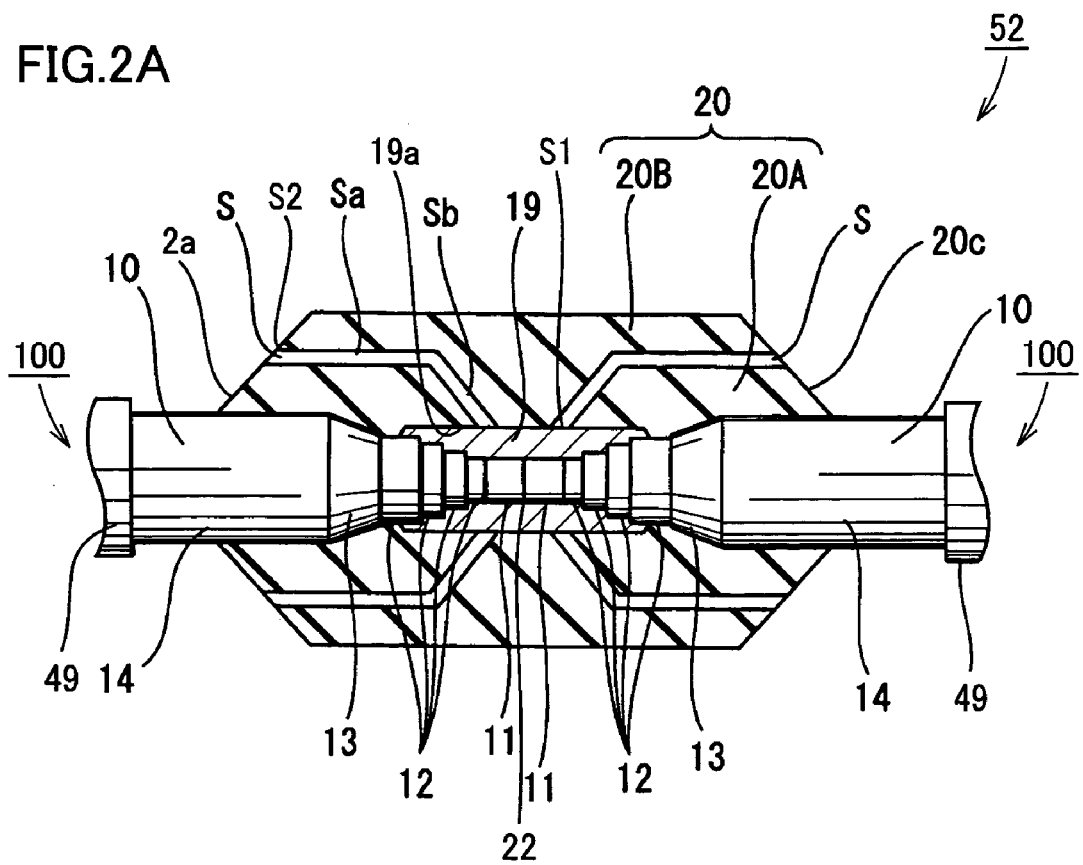
FIG. 2A is a longitudinal cross section illustrating a manner of connecting the cores of the superconducting cables of the first embodiment.

With reference to FIG. 2A, the present embodiment provides a superconducting cable joint structure 52. More specifically, two opposite cable cores 10 have their respective formers 11 and superconducting layers 12 each exposed stepwise so that they can be connected to conductor connection sleeve 19. Formers 11 abuts against each other and conductor connection sleeve 19, formed in a cylinder of metal (e.g., copper, aluminum or the like), is externally fitted and connected to establish a conductor connection 22.

Conductor connection sleeve 19 and superconducting layer 12 are electrically connected for example with solder, and conductor connection sleeve 19 and former 11 are compression-connected.

Conductor connection sleeve 19 is covered with first and second, coolant impregnated papers 20A and 20B wound therearound to serve as a joint insulation layer 20. As well as insulation layer 13, the first and second coolant impregnated papers 20A and 20B may also be formed of polypropylene laminated paper (PPLP) formed of a polypropylene film at least having one surface with a kraft paper bonded thereon, or may be kraft paper.

Figure 2B:
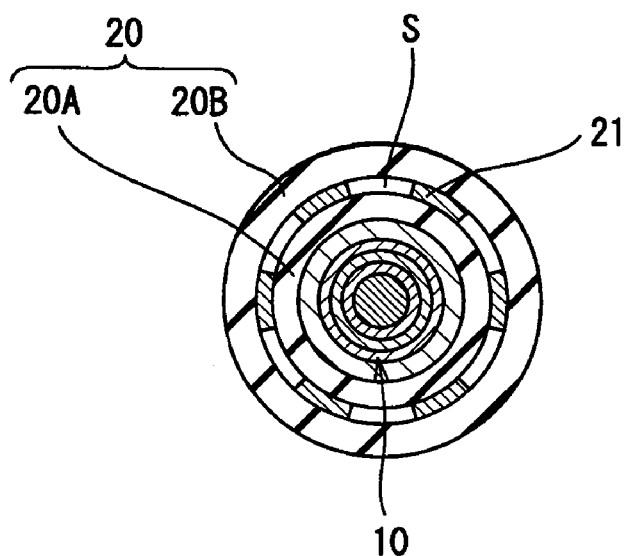
FIG. 2B is an orthogonal cross section thereof.

More specifically, as shown in FIG. 2A, conductor connection sleeve 19 has wound therearound the first coolant impregnated paper 20A divided in two as seen longitudinally, and, as shown in FIG. 2B, the first coolant impregnated paper 20A has a radially outer surface with spacers 21 arranged thereon circumferentially and spaced, and thereon the second coolant impregnated paper 20B is wound to form joint insulation layer 20 having a coolant path S.

Note that joint insulation layer 20 has an end with a side surface 20c inclined so that it does not form a right angle relative to the longitudinal direction of cable core 10 and is thus smoothly adjacent to the cable core.

If side surface 20c forms a right angle relative to the longitudinal direction of the cable and thus provides a significantly angled portion a voltage applied to superconducting layer 12 may increase an electric field created at a boundary of joint insulation layer 20 and side surface 20c, and an equipotential surface of the electric field created therearound may not be maintained at the significantly angled portion in parallel, resulting in the electric field exceeding a critical value. Joint insulation layer 20 having an end with side surface 20c smoothly adjacent to cable core 10 can effectively contribute to an alleviated electric field at the boundary.

Furthermore, as shown in FIG. 2A, coolant path S has a horizontal portion Sa and an inclined portion Sb. Horizontal portion Sa has an end communicating with coolant layer R and inclined portion Sb also has an end adjacent to an outer surface of conductor connection sleeve 19.

In other words, coolant path S has inclined path Sb connecting a radially inner opening S1 of coolant path S and a radially outer opening S2 of coolant path S. Radially inner opening S1 is positioned at conductor connection sleeve 19 along a radially outer surface 19a, which directly contacts the coolant. Portion Sb is inclined relative to the longitudinal direction of cable core 10, rather than perpendicular thereto, for the same reason as side surface 20c is inclined.

Thus, opposite cable cores 10 have their respective conductive layers 12 connected together by a normal conductor, or conductor connection sleeve 19, externally fitted thereon. Although sleeve 19 generates heat, a coolant of coolant layer R corresponding to internal space 71 of inner corrugated pipe 15 can flow into coolant path S formed in joint insulation layer 20 and the heat generated at sleeve 19 can be diffused to coolant layer R through convection of the coolant in coolant path S to prevent sleeve 19 from overheating.

Note that while in the present embodiment, as shown in FIG. 2B, more than one coolant path S are circumferentially arranged, any number thereof may be arranged. For example, only a single coolant path may be arranged. Furthermore, spacer 21 is suitably interposed internal to the insulation layer formed of coolant impregnated papers 20A and 20B wound in layers. However, it may be arranged between a radially outer surface of cable core 10 and joint insulation layer 20. Furthermore, joint insulation layer 20 may be an insulation resin molding.

SECOND EMBODIMENT

Figure 3:
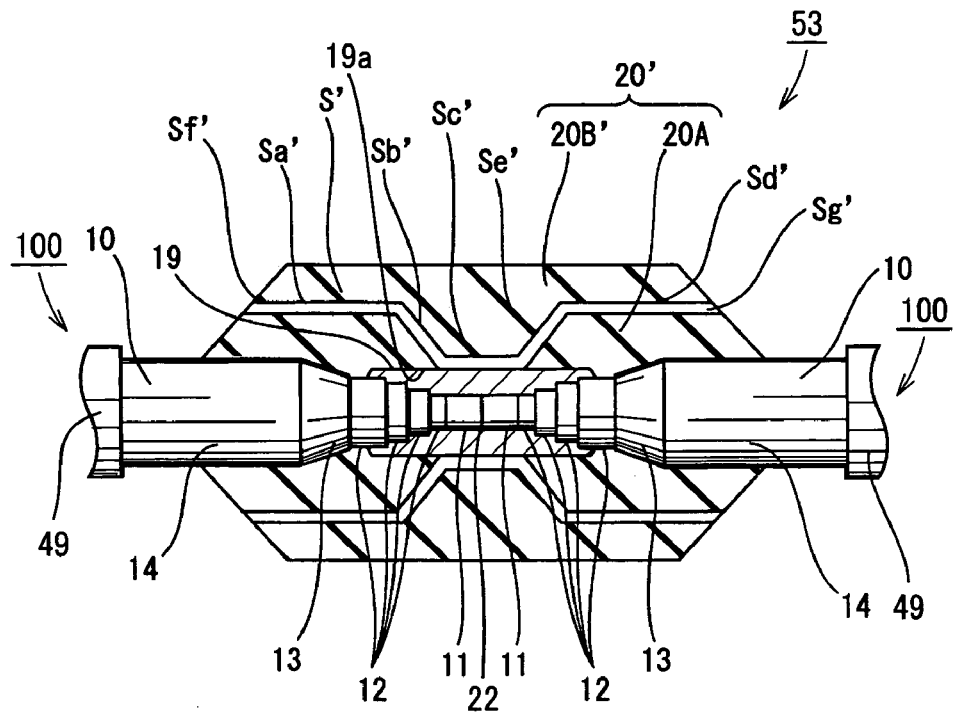
FIGS. 3–5 are longitudinal cross sections illustrating manners of connecting the cores of the superconducting cables in second to fourth embodiments, respectively.

With reference to FIG. 3, the present embodiment differs from the first embodiment in that while the present embodiment provides a superconducting cable joint structure 53 including a joint insulation layer 20' having a coolant path S' extending along cable core 10, as seen longitudinally, and communicating at a portion adjacent to conductor connection sleeve 19.

Coolant path S' has a horizontal portion Sa' communicating an end Sf' to coolant layer R, an inclined portion Sb' communicating with horizontal portion Sa' and having an end adjacent to conductor connection sleeve 19 at radially outer surface 19a, a horizontal portion Sd' communicating an end Sg' to coolant layer R, an inclined portion Se' communicating with horizontal portion Sd' and having an end adjacent to sleeve 19 at surface 19a, and a communication portion Sc' allowing opposite inclined portions Sb' and Se' to have their respective ends communicating with each other.

More specifically, conductor connection sleeve 19 has wound therearound the first coolant impregnated paper 20A divided in two as seen longitudinally. The first coolant impregnated paper 20A is then provided on a radially outer surface thereof with spacers arranged circumferentially and spaced. Thereon a second coolant impregnated paper 20B' is wound. Joint insulation layer 20' having coolant path S' is thus formed. In doing so, also arranging spacers between the ends of inclined portions Sb' and Se' on an outer surface of sleeve 19 such that the spacers are circumferentially arranged and are also spaced, and winding the second coolant impregnated paper 20B' therearound allows communication portion Sc' to be formed horizontal and adjacent to sleeve 19 at surface 19a.

The above arrangement allows a coolant present in coolant layer R external to joint insulation layer 20' to flow into coolant path S' at one end Sg' and flow out at the other end Sf'. The coolant can thus circulate through coolant path S' to more efficiently cool sleeve 19.

The remainder of the configuration of the present embodiment is similar to that of the configuration of the first embodiment.

THIRD EMBODIMENT

In the present embodiment will be described a structure jointing together a terminal of a superconducting cable and a resin unit employed to secure a normal conducting cable.

Figure 4:
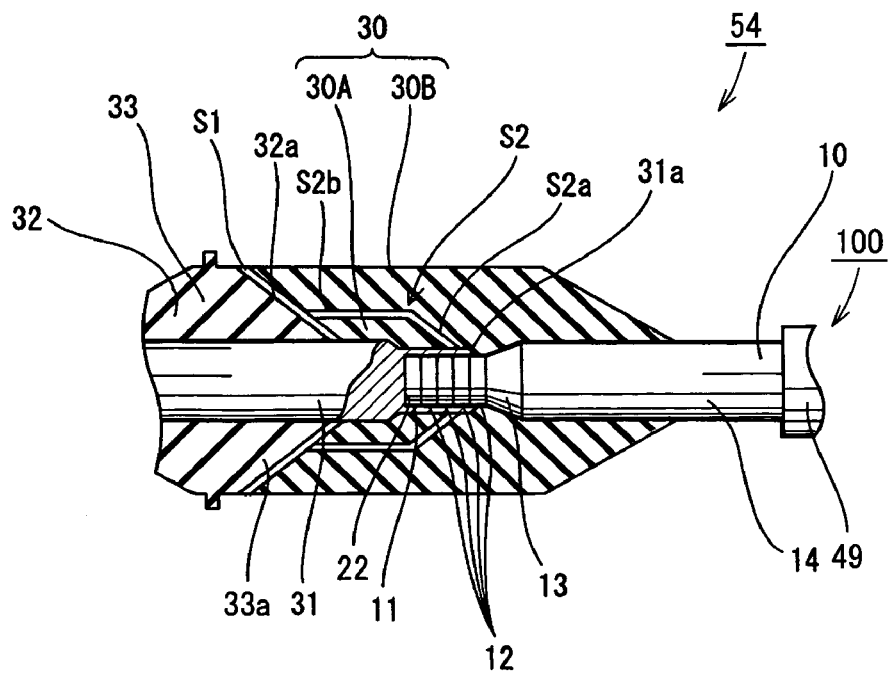

With reference to FIG. 4, the present embodiment differs from the first embodiment in that the present embodiment provides a superconducting cable joint structure 54 connecting the superconducting cable 100 cable core 10 to a conductor 31 of a resin unit 33 employed to secure a normal conducting cable to an external member.

In resin unit 33 conductor 31 formed of aluminum or copper is surrounded by a securing portion of insulator 32 formed of epoxy resin in the form of a rhomboid as seen in cross section. Securing portion of insulator 32 has an end with conductor 31 protruding and thus exposed, and having an end, connection portion 31a, which is externally fitted on and thus connected to superconducting layer 12 of cable core 10.

An outer surface of connection portion 31a, which serves as a conductor connection sleeve and a side surface 32a of the end of securing portion of insulator 32 are covered with coolant impregnated papers 30A and 30B wound there around to form a joint insulation layer 30. Joint insulation layer 30 and normal conducting cable 33 have an interface 33a inclined relative to the longitudinal direction of cable core 14 and provided with a coolant path S1.

More specifically, side surface 32a is provided with spaced spacers (not shown) along a circumference of cable core 10, and the first coolant impregnated paper 30A is wound around and thus covers a protrusion of conductor 31 serving as conductor connection 22. Then the first coolant impregnated paper 30A is also externally, circumferentially provided with spaced spacers (not shown), and thereon the second coolant impregnated paper 30B is wound to form joint insulation layer 30. In other words, joint insulation layer 30 and securing portion of insulator 32 have an interface provided with the first coolant path S1 communicating with coolant layer R, and joint insulation layer 30 is internally provided with the second coolant path S2 communicating the first coolant path S1 to the conductor 31 end, connection portion 31a.

The second coolant path S2 has a horizontal portion S2b communicating with the first coolant path S1 and an inclined portion S2a adjacent to conductor 31 at end, connection portion 31a. Note that while the first coolant path S1 has an end communicating with conductor 31, it is only required to at least communicate with the second coolant path S2. It is not a requirement that the first coolant path S1 communicate with conductor 31.

Thus coolant layer R external to cable core 10 can have a coolant flowing through the first coolant path S1 into the second coolant path S2 so that heat generated at end, connection portion 31a of conductor 31 serving as conductor connection 22 can be diffused through the first and second coolant paths S1 and S2 to coolant layer R to prevent conductor connection 22 from overheating.

While securing portion of insulator 32 is suitably formed of epoxy resin when heat resistance, dimensional stability and adhesion are considered, it is not limited to a specific material as long as it exhibits high heat resistance, provides a small percentage of contraction (or high dimensional stability) as it cures, and an excellent adhesive property. Furthermore, the resin unit 32 conductor 31 may be a superconductor.

FOURTH EMBODIMENT

Figure 5:
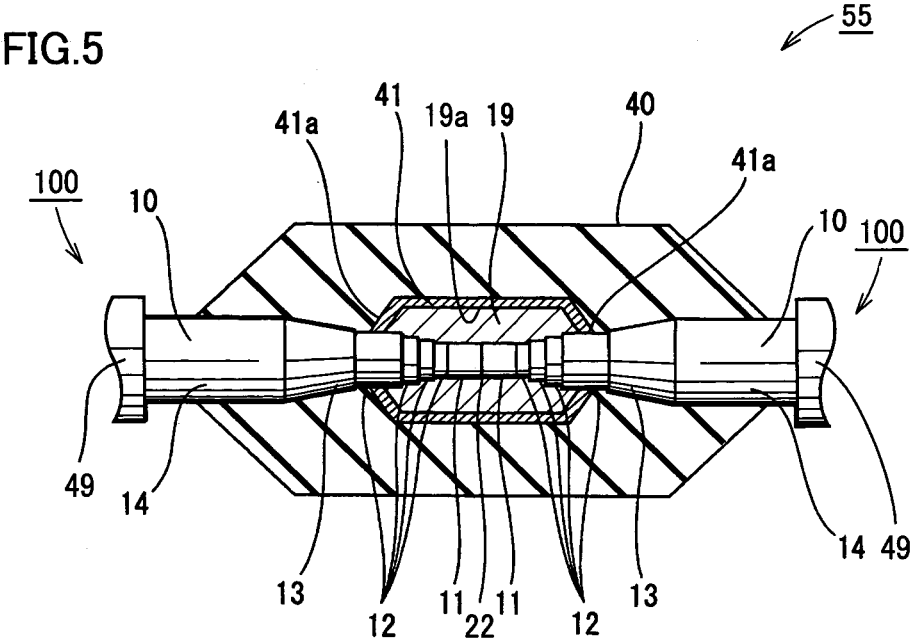

With reference to FIG. 5, the present embodiment provides a superconducting cable joint structure 55 including conductor connection sleeve 19 having a radially outer surface with a superconducting wire 41 spirally wound therearound and soldered thereto to alleviate generation of heat. A joint insulation layer 40 is not provided with a coolant path. Superconducting wire 41 is similar in configuration to superconducting layer 12 shown in FIG. 1C and it may be wound densely or sparsely. Superconducting wire 41 has opposite ends 41a abutting against cable core 10 at superconducting layer 12. Thus superconducting wire 41 has the opposite ends electrically connected to former 11 of each of two superconducting cables 100 connected.

Thus, opposite cable cores 10 have their respective superconducting layers 12 and formers 11 connected by externally fitted conductor connection sleeve 19 that has a radially outer surface with superconducting wire 41 connected thereto. As superconducting wire 41 is smaller in resistance than conductor connection sleeve 19, a current tends to flow through wire 41 rather than sleeve 19. Sleeve 19 can thus generate a reduced quantity of heat.

While in the present embodiment superconducting wire 41 is spirally wound, wire 41 may simply be arranged on conductor connection sleeve 19 at radially outer surface 19a longitudinally (or in the longitudinal direction of cable core 10). Alternatively, wire 41 may simply be buried in conductor connection sleeve 19. Furthermore, wire 41 is not required to have an end in contact with superconducting layer 12. Furthermore, while in the present embodiment wire 41 is soldered to layer 12, wire 41 may simply be buried as joint insulation layer 40 is wound. Alternatively, wire 41 may be arranged radially inner than sleeve 19.

The remainder of the configuration of the present embodiment is similar to that of the configuration of the first embodiment.

While the present embodiment has been described in conjunction with superconducting cable joint structure 55 employed to connect superconducting cables together, the present invention is also applicable to a superconducting cable joint structure employed to connect a superconducting cable and a normal conducting cable together.

Figure 6:
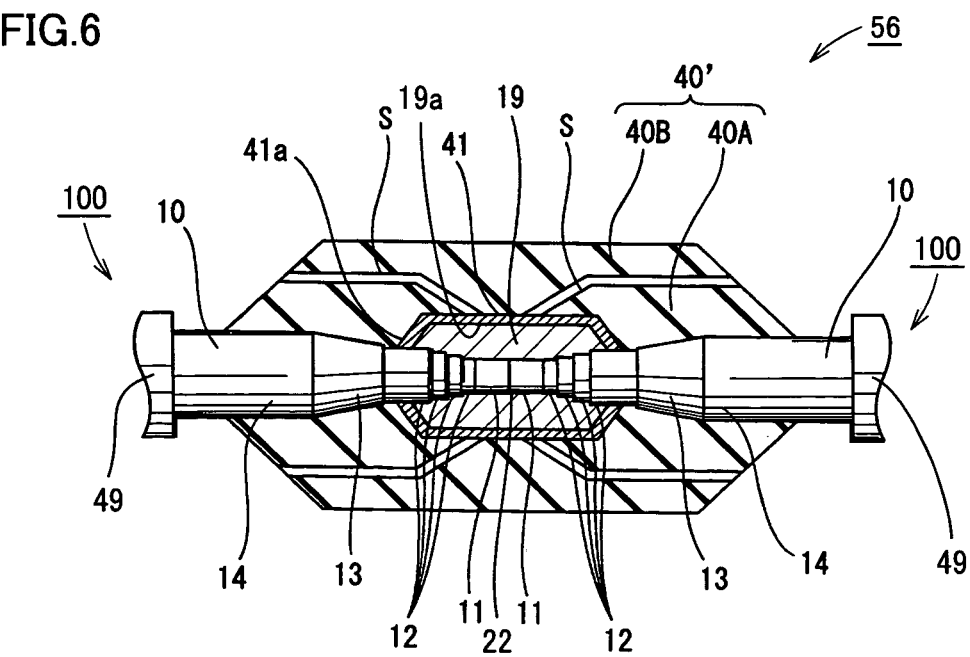
FIG. 6 is a cross section illustrating an exemplary variation of the fourth embodiment.

Furthermore, with reference to FIG. 6, the present embodiment provides another superconducting cable joint structure 56, in which a first coolant impregnated paper 40A divided in two as seen longitudinally is wound around and thus covers superconducting wire 41 arranged on conductor connection sleeve 19 at radially outer surface 19a and an outer surface of cable core 10 adjacent thereto. Furthermore, the first coolant impregnated paper 40A is externally, circumferentially surrounded by spaced spacers (not shown) and on the spacers a second coolant impregnated paper 40B is wound. Thus, a joint insulation layer 40' has coolant path S allowing external coolant layer R to communicate with superconducting wire 41 arranged on conductor connection sleeve 19 at radially outer surface 19a.

Thus a coolant external to joint insulation layer 40' can flows into coolant path S. If conductor connection sleeve 19 and superconducting wire 41 generate heat, coolant path S allows the heat to be diffused to the coolant. This can provide a synergistic, effective approach against heat as it interacts with the effect of reducing a quantity of heat that is attributed to providing sleeve 19 with wire 14.

FIFTH EMBODIMENT

Figure 7:
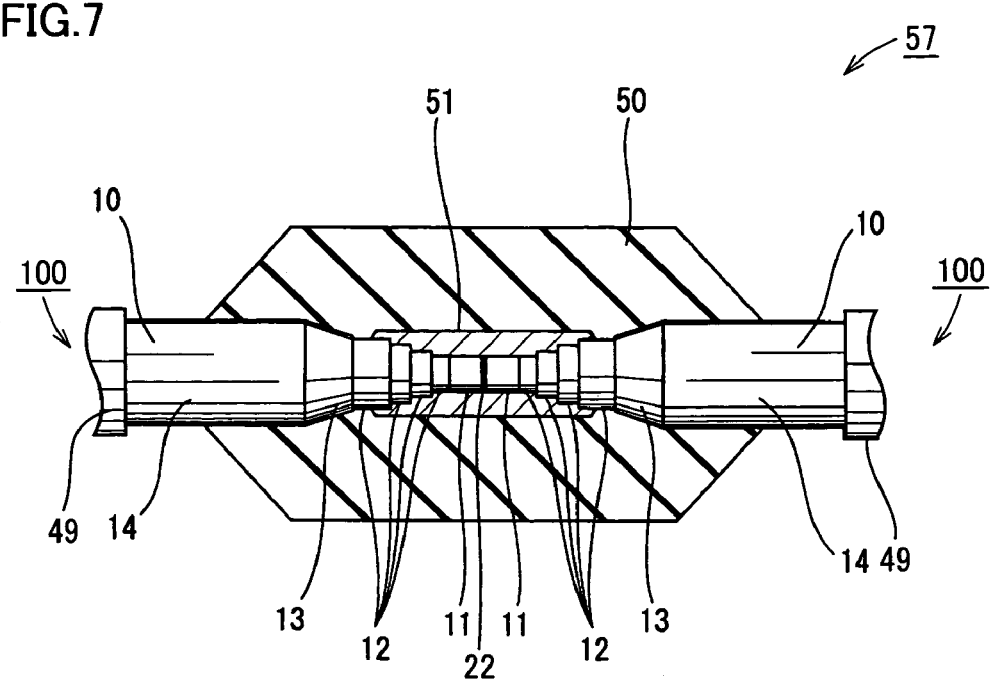
FIG. 7 is a longitudinal cross section illustrating a manner of connecting the cores of the superconducting cables in a fifth embodiment.

With reference to FIG. 7, the present embodiment provides a superconducting cable joint structure 57. More specifically, opposite cable cores 10 having their respective formers 11 abutting against each other are welded and thus connected together. Furthermore, former 11 and superconducting layer 12 have an outer surface with a superconducting wire 51 spirally wound therearound and soldered or the like to layer 12 to establish electrical connection. Furthermore, radially external thereto is a coolant impregnated paper wound therearound to form a joint insulation layer 50.

Thus, opposite cable cores 10 have their respective superconducting layers 12 electrically connected by superconducting wire 51. The electrical connection can be achieved with electrical resistance having a small value so that the connection can generate a reduced quantity of heat. Furthermore, while superconducting wire 51 used to provide electrical connection has small rigidity, formers 11 having sufficient rigidity can be welded and connected together, and the connection can have constantly maintained strength.

Note that while in the present embodiment superconducting wire 51 is spirally wound, wire 51 may simply be placed on superconducting layer 12 and former 11 at an outer surface longitudinally. Furthermore, while in the present embodiment wire 51 is soldered to layer 12, wire 51 may simply be buried by a force of joint insulation layer 50 wound therearound.

The remainder of the configuration of the present embodiment is similar to that of the configuration of the first embodiment.

Figure 8:
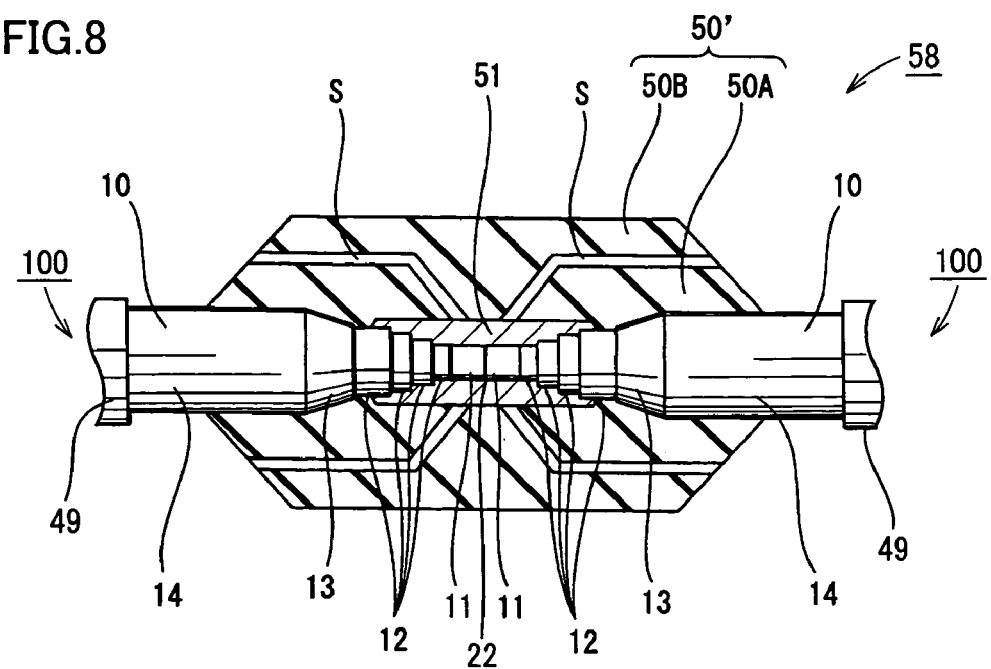
FIG. 8 is a cross section illustrating an exemplary variation of the fifth embodiment.

Furthermore, with reference to FIG. 8, the present embodiment provides another superconducting cable joint structure 58. More specifically, superconducting wire 51 and cable core 10 adjacent thereto have an external surface covered with a first coolant impregnated paper 50A divided in two as seen longitudinally and wound therearound. The first coolant impregnated paper 50A is externally, circumferentially provided with spaced spacers (not shown), and on the spacers a second coolant impregnated paper 50B is wound. Thus a joint insulation layer 50' has coolant path S allowing external coolant layer R to communicate with superconducting wire 51.

Thus, a coolant external to joint insulation layer 50' can flow into coolant path S. If superconducting wire 51 generates heat, coolant path S allows the heat to be diffused to the coolant. This can provide a synergistic, adequate approach against heat as it interacts with the effect of reducing a quantity of heat that is attributed to employing superconducting wire 51.

SIXTH EMBODIMENT

Figure 9:
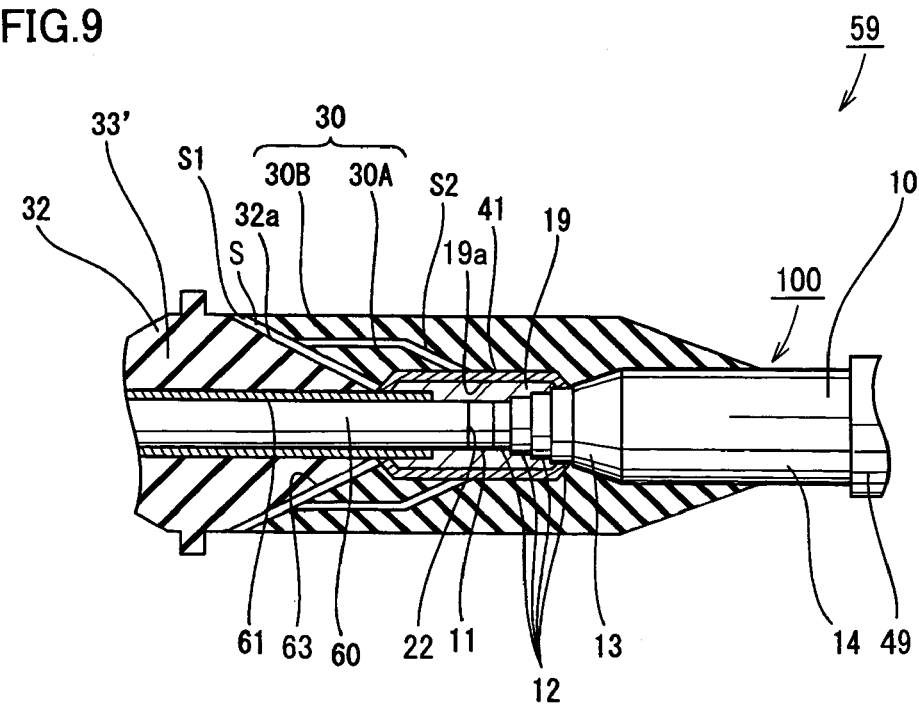
FIGS. 9 and 10 are longitudinal cross sections illustrating manners of connecting the cores of the superconducting cables in sixth and seventh embodiments, respectively.

With reference to FIG. 9, the present embodiment differs from the third embodiment, as follows: the present embodiment provides a superconducting cable joint structure 59, in which a securing resin unit 33' corresponding to a normal conducting cable has a conductor 60 with a superconductor 61 spirally wound therearound, and furthermore, the resin unit 33' superconductor 61 and the cable core 10 superconducting layer 12 are connected together by conductor connection sleeve 19 externally fitted thereon and furthermore having an outer surface with superconducting wire 41 spirally wound therearound.

More specifically in resin unit 33' conductor 60 formed of aluminum or copper is surrounded by superconductor 61 spirally wound therearound and superconductor 61 is also surrounded by securing portion of insulator 32 formed of epoxy resin in the form of a rhomboid as seen in cross section. Securing portion of insulator 32 has an end with conductor 60 and superconductor 61 protruding stepwise.

Conductor 60 has an end abutting against cable core 10 at former 11, and superconductor 61 and superconducting layer 12 are connected together by conductor connection sleeve 19 externally fitted thereon and having radially outer surface 19a with superconducting wire 41 spirally wound therearound, and soldered and thus connected thereto.

Securing portion of insulator 32 has an end with side surface 32a provided with spacers (not shown) arranged circumferentially and spaced and the first coolant impregnated paper 30A is wound to cover conductor connection sleeve 19 provided with superconducting wire 41. Furthermore, the first coolant impregnated paper 30A is externally, circumferentially surrounded by spacers (not shown) and thereon the second coolant impregnated paper 30 is wound to form joint insulation layer 30. Thus, joint insulation layer 30 and securing portion of insulator 32 have an interface 63 provided with the first coolant path S1 communicating with coolant layer R and joint insulation layer 30 is internally provided with the second coolant path S2 communicating the first coolant path S1 to superconducting wire 41.

The remainder of the configuration of the present embodiment is similar to that of the configuration of the third embodiment.

SEVENTH EMBODIMENT

Figure 10:
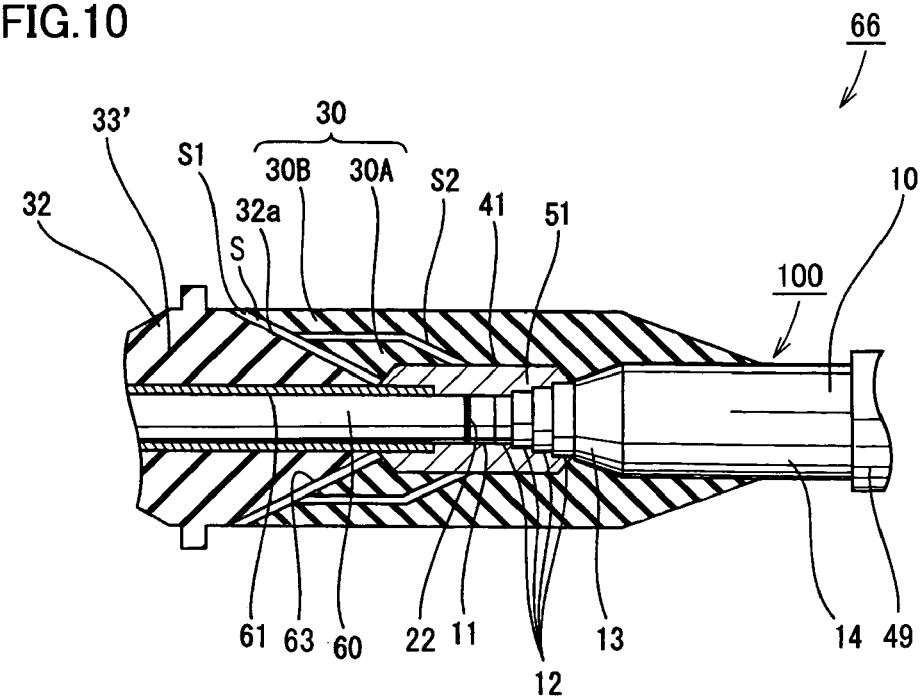
Figure 11:
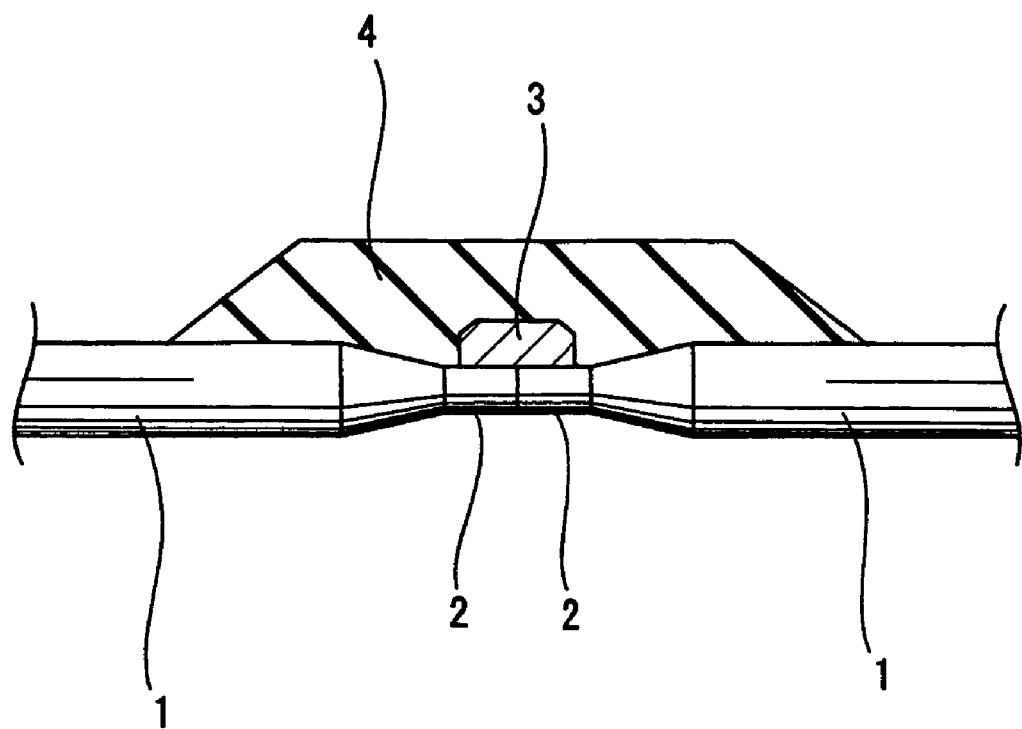
FIG. 11 is a cross section of a conventional example.

With reference to FIG. 10, the present embodiment differs from the sixth embodiment in that the present embodiment provides a superconducting cable joint structure 66 in which the securing resin unit 33' conductor 60 and the cable core 10 former 11 abut against each other and are welded together, and former 11, superconductor 61 and superconducting layer 12 have an external surface with superconducting wire 51 spirally wound therearound and soldered or the like to superconducting layer 12, 61 to establish electrical connection.

Furthermore, as well as in the third and sixth embodiments, the first and second coolant impregnated papers 30A and 30B are wound to form joint insulation layer 30 having the second and first coolant paths S2 and S1.

The remainder of the configuration of the present embodiment is similar to that of the configuration of the third embodiment.

In accordance with the present invention, as apparent from the above description, a superconducting cable's joint connection has externally fitted thereon a joint insulation layer provided with a coolant path so that heat generated at a conductor connection can be diffused by a coolant flowing into the coolant path to prevent the conductor connection from overheating. Furthermore, at the conductor connection, conductors can be connected together by an externally fitted, superconducting wire equipped conductor connection sleeve or directly by the superconducting wire to allow the joint to generate a reduced quantity of heat.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A structure jointing together a terminal of a superconducting cable and a normal conducting cable, the structure comprising:
   a joint insulation layer provided in contact with an external circumference of a conductor connection connecting together a conductor of said superconducting cable and a conductor of said normal conducting cable; and
   at least a single coolant path provided within said joint insulation layer to cool said conductor connection.

2. The structure of claim 1, wherein:
   said superconducting cable has an external casing and a cable core inserted into an internal space of said external casing;
   said cable core has a former formed of a long filament, a superconducting layer provided on a radially outer surface of said former, and an insulation layer arranged radially outer than said superconducting layer; and
   said internal space serves as a coolant layer passing a coolant therethrough, said coolant layer directly contacting said joint insulation layer, with said coolant path passing the coolant of said coolant layer.

3. The structure of claim 2, wherein:
   said superconducting cable has more than one said cable core, each having a shield layer with a superconducting wire arranged radially outer than said insulation layer, and a protection layer formed of an insulator and arranged radially outer than said shield layer; and said superconducting layer of said cable core and said conductor of said normal conducting cable are connected together via said conductor connection covered with said joint insulation layer.

4. The structure of claim 1, wherein said joint insulation layer is formed of coolant impregnated papers deposited in layers.

5. The structure of claim 1, wherein said conductor connection includes a conductor connection sleeve compression-connected to a radially outer surface of said conductor of said superconducting cable and said conductor of said normal conducting cable arranged to abut against each other.

6. The structure of claim 5, wherein said coolant path has an inclined path connecting said radially inner opening to a radially outer opening of said coolant path.

7. The structure of claim 5, wherein:
said superconducting cable has a cable core;
said cable core has a former; and
said cable core has a spirally wound, multilayered superconducting layer, said cable core has a terminal with said former and said multilayered superconducting layer exposed stepwise, and said conductor connection sleeve has a radially inner surface connected to said former and said multilayered superconducting layer exposed stepwise.

8. The structure of claim 1, wherein said joint insulation layer is formed of an insulating resin molding provided with said coolant path.

9. The structure of claim 1, wherein:
said superconducting cable and said normal conducting cable are connected together via said conductor connection such that said conductor of said normal conducting cable and said conductor of said superconducting cable are connected together via said conductor connection circumferentially provided with said joint insulation layer; and
said coolant path is arranged at an interface of an end surface of said joint insulation layer and an outer end surface of said normal conducting cable.

10. The structure of claim 9, wherein:
said superconducting cable has a cable core; and
said interface is inclined relative to a longitudinal direction of said cable core and is provided with said coolant path.

11. The structure of claim 5, wherein said coolant path has a radially inner opening along a radially outer surface of said conductor connection sleeve to allow said radially outer surface to directly contact said coolant.

12. A structure jointing together a first superconducting cable and a second superconducting cable that are used at cryogenic temperatures, the structure comprising:
a joint insulation layer provided in contact with an external circumference of a conductor connection connecting together a conductor of said first superconducting cable and a conductor of said second superconducting cable; and
at least a single coolant path provided within said joint insulation layer to cool said conductor connection.

13. The structure of claim 12, wherein:
said first superconducting cable has an external casing and a cable core inserted into an internal space of said external casing;
said cable core has a former formed of a long filament, a superconducting layer provided on a radially outer surface of said former, and an insulation layer arranged radially outer than said superconducting layer; and
said internal space serves as a coolant layer passing a coolant therethrough, said coolant layer directly contacting said joint insulation layer, with said coolant path passing the coolant of said coolant layer.

14. The structure of claim 13, wherein:
said first superconducting cable has more than one said cable core, each having a shield layer with a superconducting wire arranged radially outer than said insulation layer, and a protection layer formed of an insulator and arranged radially outer than said shield layer; and
said superconducting layer of said cable core and a superconducting layer of a cable core of said second superconducting cable are connected together via said conductor connection covered with said joint insulation layer.

15. The structure of claim 12, wherein said joint insulation layer is formed of coolant impregnated papers deposited in layers.

16. The structure of claim 12, wherein:
said conductor connection includes a conductor connection sleeve that is compression-connected to a radially outer surface of said conductor of said first superconducting cable and that is compression-connected to a radially outer surface of said conductor of said second superconducting cable; and
said conductor of said first superconducting cable is arranged to abut against said conductor of said second superconducting cable.

17. The structure of claim 16, wherein said coolant path has an inclined path connecting said radially inner opening to a radially outer opening of said coolant path.

18. The structure of claim 16, wherein:
said first superconducting cable has a cable core;
said cable core has a former;
said cable core has a spirally wound, multilayered superconducting layer;
said cable core has a terminal with said former and said multilayered superconducting layer exposed stepwise; and
said conductor connection sleeve has a radially inner surface connected to said former and said multilayered superconducting layer exposed stepwise.

19. The structure of claim 12, wherein said joint insulation layer is formed of an insulating resin molding provided with said coolant path.

20. The structure of claim 12, wherein:
said first superconducting cable and said second superconducting cable are connected together via said conductor connection such that said conductor of said first superconducting cable and said conductor of said second superconducting cable are connected together via said conductor connection circumferentially provided with said joint insulation layer; and
said coolant path is arranged at an interface of an end surface of said joint insulation layer and an outer surface of said conductor connection.

21. The structure of claim 20, wherein:
said first superconducting cable has a cable core; and
said interface is inclined relative to a longitudinal direction of said cable core.

* * * * *